(12) United States Patent
Lipton et al.

(10) Patent No.: US 7,375,886 B2
(45) Date of Patent: May 20, 2008

(54) METHOD AND APPARATUS FOR OPTIMIZING THE VIEWING DISTANCE OF A LENTICULAR STEREOGRAM

(75) Inventors: Lenny Lipton, Greenbrae, CA (US); William James McKee, Jr., Tiburon, CA (US); Mark H. Feldman, Walnut Creek, CA (US)

(73) Assignee: Stereographics Corporation, Beverly Hills, CA (US)

( * ) Notice: Subject to any disclaimer, the term of this patent is extended or adjusted under 35 U.S.C. 154(b) by 115 days.

(21) Appl. No.: 10/827,871

(22) Filed: Apr. 19, 2004

(65) Prior Publication Data
US 2006/0012878 A1 Jan. 19, 2006

(51) Int. Cl.
*G02B 27/22* (2006.01)
*H04N 9/47* (2006.01)
*H04N 13/04* (2006.01)

(52) U.S. Cl. .................... 359/463; 359/462; 348/59

(58) Field of Classification Search ............... 359/462, 359/463; 348/59
See application file for complete search history.

(56) References Cited

U.S. PATENT DOCUMENTS 5,528,420 A * 6/1996 Momochi .................... 359/463
6,519,088 B1 * 2/2003 Lipton ........................ 359/463

* cited by examiner

*Primary Examiner*—Audrey Chang
(74) *Attorney, Agent, or Firm*—Smyrski Law Group, A P.C.

(57) ABSTRACT

A method and apparatus for optimizing viewing distance for a stereogram system. In a stereogram, an image is held in close juxtaposition with a lenticular screen. In the invention, a data store is used to store optimum pitch values for specified viewing distances. An interdigitation program then acts on the table values and creates a mapping of interdigitated views for each viewing distance. The user can then select or specify a desired viewing distance, and the optimum mapping of views is automatically chosen for display.

19 Claims, 9 Drawing Sheets

METHOD AND APPARATUS FOR OPTIMIZING THE VIEWING DISTANCE OF A LENTICULAR STEREOGRAM

FIELD OF THE INVENTION

This invention relates to three-dimensional stereoscopic print images, also known as lenticular stereograms or parallax panoramagrams, and more particularly, to a method and apparatus for increasing the viewing zone of images in lenticular stereograms.

BACKGROUND OF THE INVENTION

Lenticular stereograms have been used for many years to display a true three-dimensional stereoscopic image without the need for the observer to wear special selection devices that selectively permit the left eye and right eye to see different images. Selection devices are typically eyeglasses that are colored (red/green) or polarized so that a left image and a right image can be viewed from one source. The lenticular stereogram is made by photomechanical reproduction and most commonly used for trading cards, picture postcards, product displays, and the like. By incorporating a cylindrical lenticular screen that has a corduroy-like surface over a properly encoded image print, a stereoscopic three-dimensional depth effect may be achieved.

As shown in FIG. 1A, the lenticules 101 have semi-cylindrical surfaces oriented so that their lengths are aligned vertically. The lenticules are in intimate juxtaposition with a print image 102, which contains columns of encoded visual information. Each column of the print image 102 is associated with a particular lenticule, and each column has a series of views ranging from a leftmost to a rightmost perspective. Thus, instead of seeing a single image as in a normal print, the observer of a panoramagram will see perspective images for both the left and right eyes due to the refractive nature of the lenticular surface of the panoramagram. More specifically, because the left eye views the lenticular stereogram from different angles than the right eye, each eye has a different view of the image creating a three-dimensional image.

Although the art of making lenticular stereograms is continuing to advance, a number of persistent problems remain which inhibit the medium from becoming more pervasive. In particular, lenticular stereograms have a limited range of points at which they can be viewed without degradation of the three-dimensional image due to the parallax effect. To properly view the entire print or display, all columnar structured images and associated columnar lenticules must be in intimate juxtaposition. The center of an image is typically viewed at a near perpendicular angle, while the left and right edges of the image may be viewed at much more acute angles. The parallax effect occurs at acute viewing angles and creates a lack of precise juxtaposition between the columnar structured image and the associated columnar lenticules. The lack of juxtaposition occurs because at a highly acute angle, the focal point of the lenticule is not properly on the associated print column and an inaccurate columnar image is viewed.

The range of points at which the full and accurate three-dimensional lenticular stereogram image can be seen is known as the "viewing zone." There have been prior art attempts to maximize the viewing zone by reducing the parallax effect. For example, U.S. Pat. No. 5,838,494 discloses a mathematical technique for adjusting the width of the print columns to match the width of the lenticular screen to optimize the viewing zone, but requires obtaining screens with precise lenticule width dimensions. U.S. Pat. No. 5,083,199 requires an air gap to improve the lenticular stereogram viewing zone, and it is not clear if paper prints will work with this method. Also, the lenticular screen is imposed on a curved structure with varying lenticule widths that is very difficult to manufacture. The article by E. Sandor et al. entitled, "Technical Info on PHSColorgrams®" (see http://www.artn.nwu.edu) discloses increasing the viewing zone of a lenticular stereogram by using print columns which are wider than the width of their corresponding lenticules but does not disclose a method for coordinating the width of the print with the width of the lenticules. Thus, none of these references provides a simple solution for maximizing the viewing zone of a lenticular stereogram.

The present invention sets out to provide a simple method for increasing the viewing zone of a lenticular stereogram.

SUMMARY OF THE INVENTION

The present invention is a simple method for increasing the viewing zone of a stereoscopic image that may be a photographic print, a projected or computer-generated image, or any other type of graphical image. The viewing zone is improved by determining the optimum column width for the image columns of the stereoscopic image. The optimum column width provides optical alignment for each column with its corresponding lenticule for a specified viewing position. The optimum column width may be determined empirically with a series of test images. Once determined, stereoscopic images having the optimum column width can be produced using an interdigitation program.

Each test image has a plurality of columns, each corresponding to a single lenticule of the lenticular screen. Each column has two single color stripes where the colors are discernible or visually distinct from each other. The colored stripes thus alternate over the complete width of the test image.

The optimum column width is determined by viewing the test image and lenticular screen with a viewing apparatus having a left eye viewing position and a right eye viewing position. When the image appears to be one color when observed from the left eye viewing position and the other color when observed from the right eye viewing position, then the optimum column width has been achieved. The test image having the optimum column width can be determined by viewing a series of such test images having different column widths. Stereoscopic images can then be produced using the optimum column width and the viewing zone will be maximized when a center column of the stereoscopic image is aligned with a center lenticule of the lenticular screen.

In this disclosure, we describe a method for optimizing the viewing distance from the display, rather than optimizing the angular extent of the viewing zone.

DETAILED DESCRIPTION OF THE INVENTION

Figure 1B:
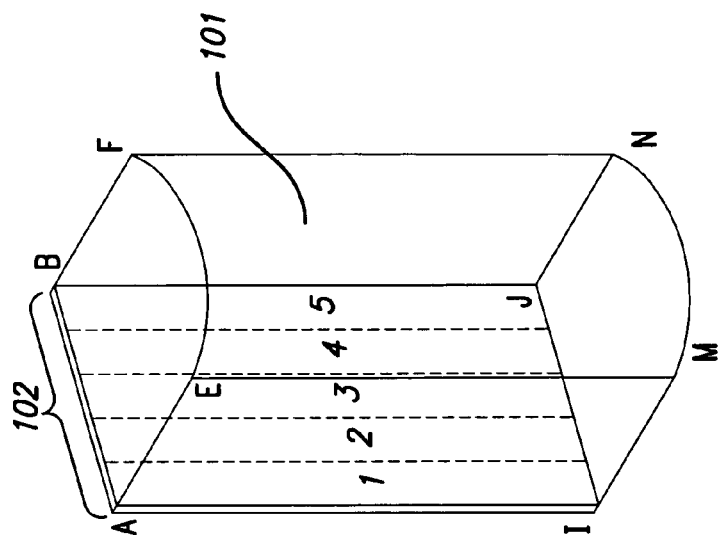
FIG. 1B is a perspective drawing showing the structure of an individual lenticule and corresponding interdigitated image from the structure of FIG. 1.
Figure 1A:
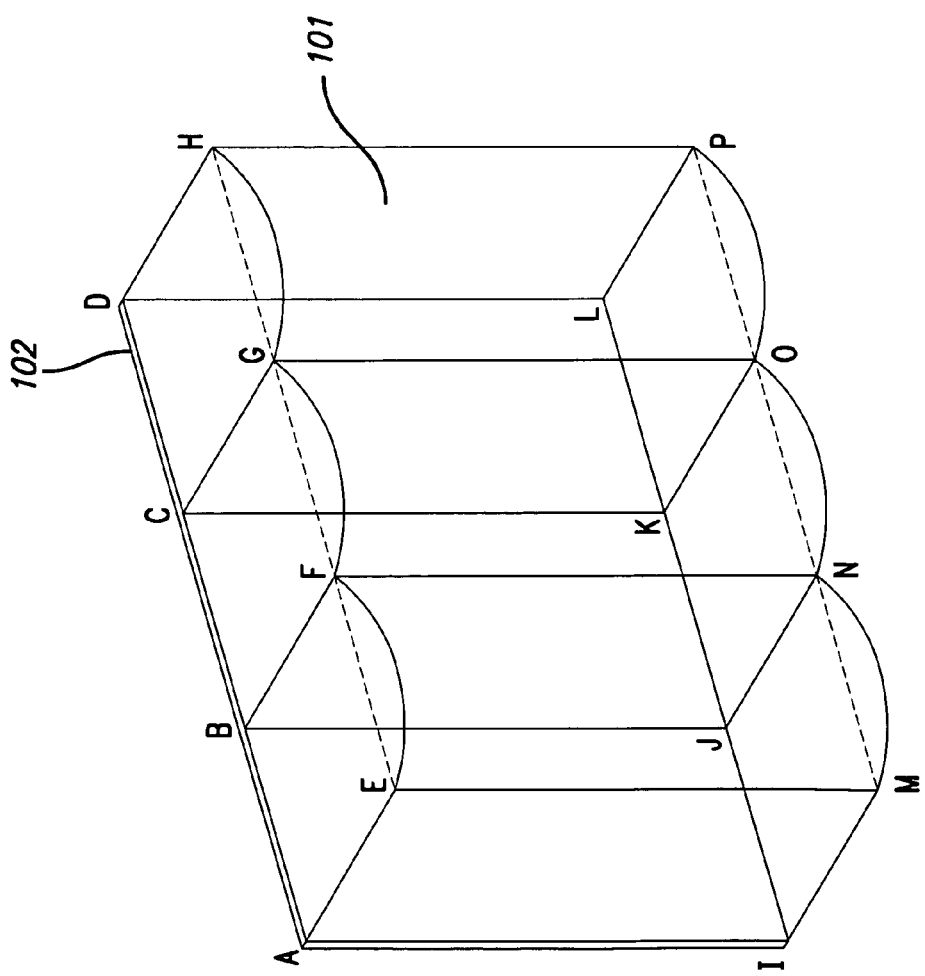
FIG. 1A is a perspective drawing showing the structure of a lenticular stereogram.

Referring to FIG. 1A, a portion of a lenticular screen 101 and associated print 102 is illustrated. The term "print" is used broadly to signify any well-known displays, such as a rear-projected display, a photographic print, a photo-mechanically-reproduced print, or an electronic display screen, as well as combinations of these known displays. The print 102 is fixed in intimate juxtaposition with the lenticular screen 101 such that two parallel planes are referenced: the plane of print 102 is defined by points ADLI and the reference plane of the lenticules is defined by points EHPM. The lenticules are individual cylindrical lenses, EFNM, FGON and GHPO having cylindrical surfaces illustrated as equal radius arcs EF, FG and GH, and corresponding arcs MN, NO and OP respectively. The lenticule screen is overlaid on top of reference plane EHPM and each lenticule is optically aligned in intimate juxtaposition with a corresponding rectangular print area on print 102 to provide different images or views from different viewing angles. For example, print area ABJI is directly behind and in intimate juxtaposition with lenticule EFNM.

Referring to FIG. 1B, a more detailed illustration of the print area ABJI and corresponding lenticule EFNM is shown. Five columns or stripes 1, 2, 3, 4 and 5 subtend the print area 102. Any number of columns may be used, but for simplicity only five columns are illustrated. Because of the optical properties of the lenticule, only one stripe can be seen from any one viewing position. Stripe 1 contains the rightmost view and as the point of view moves from right to left, stripes 2, 3, 4 and 5 are viewed sequentially.

The production of this kind of interdigitated stereogram print is well understood. In the exemplary five-column stereogram, five perspective views are produced by five cameras pointing straight ahead equidistant from each other and taking photographic images simultaneously. These images may be either captured digitally or by conventional photographic means and then digitally scanned. These digital images are then sliced up using an interdigitation software algorithm and reassembled as a stereogram print. The stereogram print is fabricated by having individual perspective image views interdigitated (sometimes mistakenly referred to as "interleaved") so that the print area that corresponds to a particular lenticule is made up of a number of discrete stripes. When viewing a lenticular stereogram made up of five interdigitated images, five distinct image views may be seen by looking at the lenticular stereogram from five different ranges of angles.

Interdigitation algorithms and software are well known in the art. An exemplary interdigitation algorithm is described in detail in International Publication No. WO 98/27456 that is hereby expressly incorporated by reference.

Figure 3A:
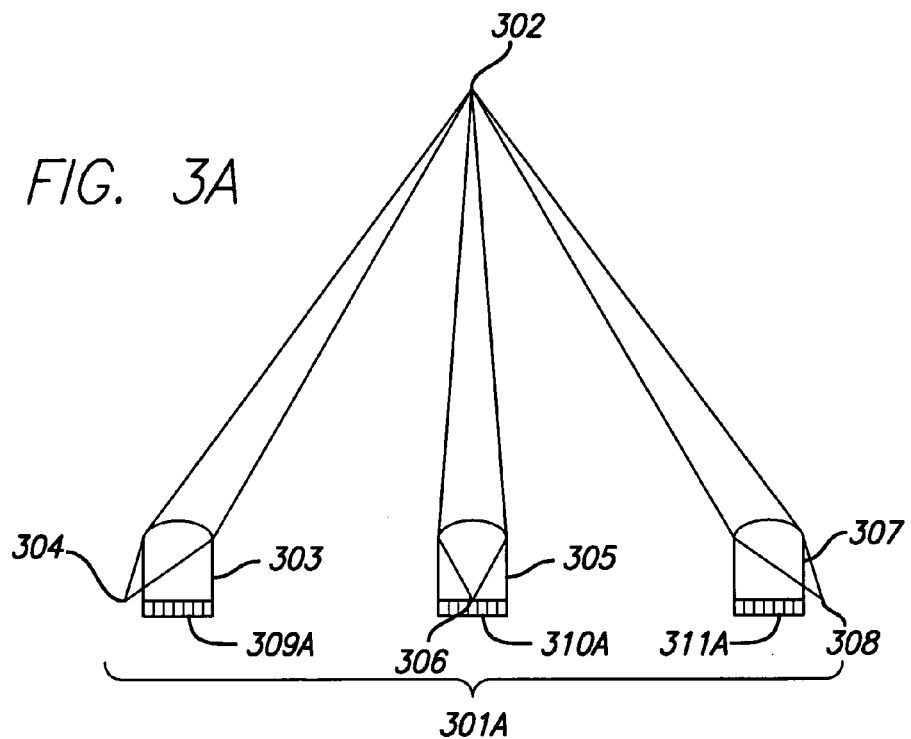
FIG. 3A is a schematic representation of a lenticular screen and print columns viewed from an observation point without making the necessary adjustment to optimize the viewing angle.

FIG. 3A illustrates the parallax problem. A lenticular print is shown to be within the extent of bracket 301A. For simplicity, only three representative lenticules 303, 305, and 307 and their corresponding print areas 309A, 310A and 311A are illustrated. As discussed, any number of lenticules and columns may be used. An observation point 302 is centrally located with an on-axial view of the lenticular print, directly above the central lenticule 305. (A perpendicular dropped from observation point 302 would intersect the horizontal center of the print and lenticule 305.) Rays of light that are observed from observation point 302 are refracted by lenticules 303, 305 and 307 and have focal points at 304, 306 and 308, respectively. The parallax problem in this example results from the focal points 304 and 308 being out of alignment with their corresponding print areas. In FIG. 3A, the focal points 304 and 308 are completely off of the print areas 309A and 311A, respectively, and, therefore, not viewed at all from observation point 302. Thus, only the print image near the central area 310A appears to be stereoscopic.

Images on either side of the center of the print may appear to be distorted or confusing because the eyes will be seeing portions of columns and their corresponding stripes that do not correspond to a proper stereoscopic image. Under such circumstances, the eyes might well be seeing a left image with the right eye and a right image with the left eye. Thus, without precise corrective shifting of the print columns relative to the lenticules, the range of viewing angles within the viewing zone is substantially reduced.

Figure 3B:
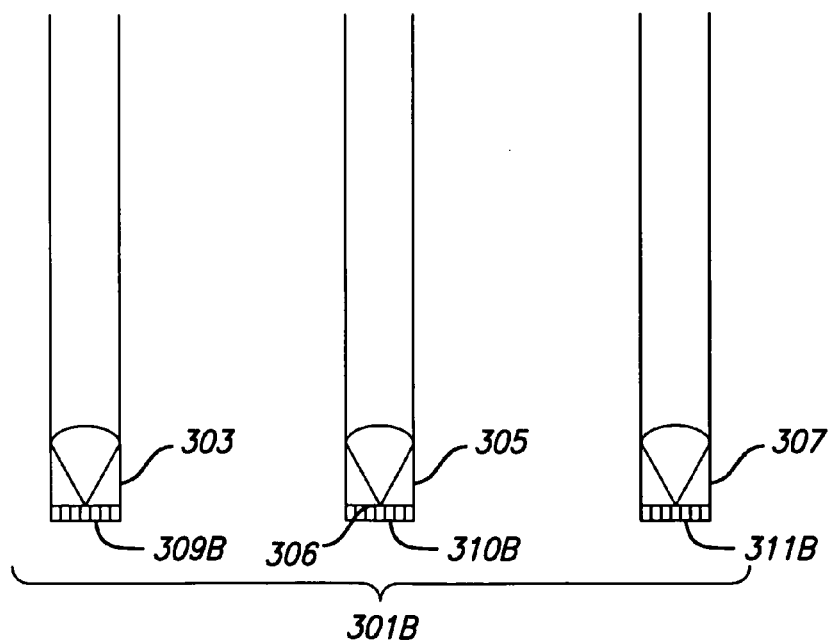
FIG. 3B is a schematic representation of a lenticular screen and print columns viewed from a remote observation point.

The parallax problem diminishes as the distance between the observation point 302 and the print increases. Referring to FIG. 3B, if the observation point (not shown) is a substantial distance from the print, the light rays from the lenticules to the observation point are more parallel and the focal points 304, 306 and 308 fall within the print areas 309B, 310B and 311B, respectively. From this observation point, the print areas 309B and 311B do not require shifting because the parallax problem does not exist at edges of prints. Thus, to avoid the parallax problem, lenticular screens of greater width must be viewed from greater distances than narrower prints to reduce the acute viewing angle at the left and right sides of the print.

Figure 3C:
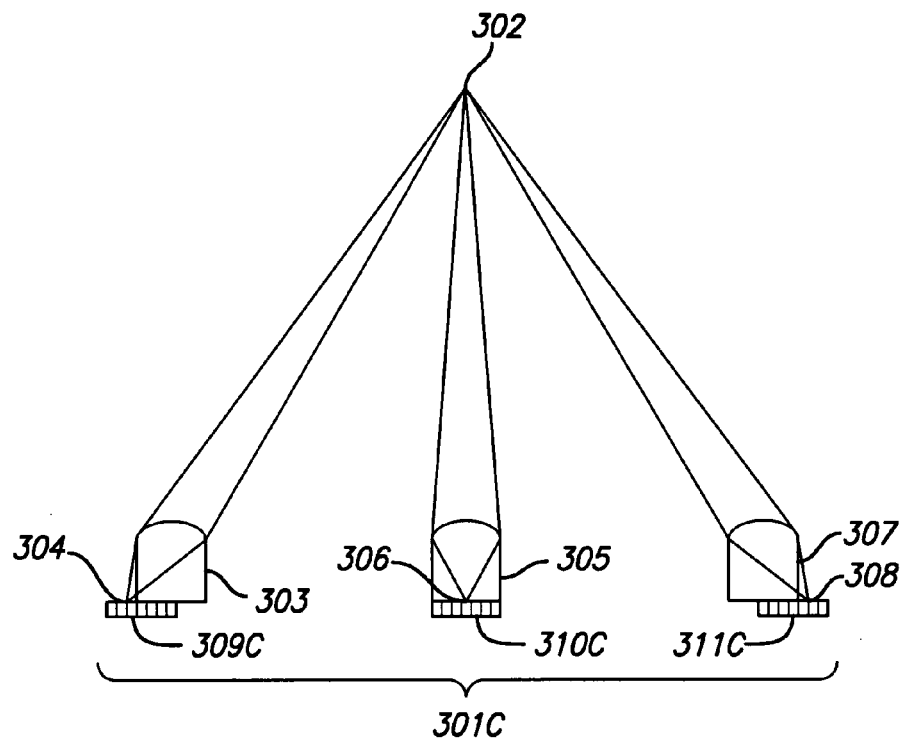
FIG. 3C is a schematic representation of a lenticular screen and print columns showing the necessary adjustment to optimize the viewing angle.

In order to view an entire stereoscopic image, the focal points of all of the lenticules must fall within the boundaries of the print areas, corresponding to each of the lenticules. FIG. 3C illustrates an embodiment of a lenticular stereogram in which the focal points of all the lenticules fall within their corresponding print areas that have been horizontally shifted. The shifted print areas eliminate the parallax problem and allow the full image to be viewed from an observation point where the light rays between the observation point and lenticules are not parallel. The parallax problem is compensated for by horizontally shifting the print areas 309C and 311C relative to the lenticules 303 and 307 so that the focal points 304 and 308 are incident upon the centers of print areas 309C and 311C respectively. Print area 310C does not require shifting because the focal point 306 is already incident close to the center of the print area 310C.

In general, full stereoscopic image projection requires that the print columns on the left side of the print be shifted to the left and that the print columns on the right side of the print be shifted to the right for the focal point of each lenticule to fall upon the proper print area column. The distance that each column is horizontally shifted is a function of the angle at which each print column is observed and is inversely proportional to the distance between the viewing point and the lenticular screen. The shifting of print area columns increases as the observation point gets closer to the lenticular screen.

Figure 1C:
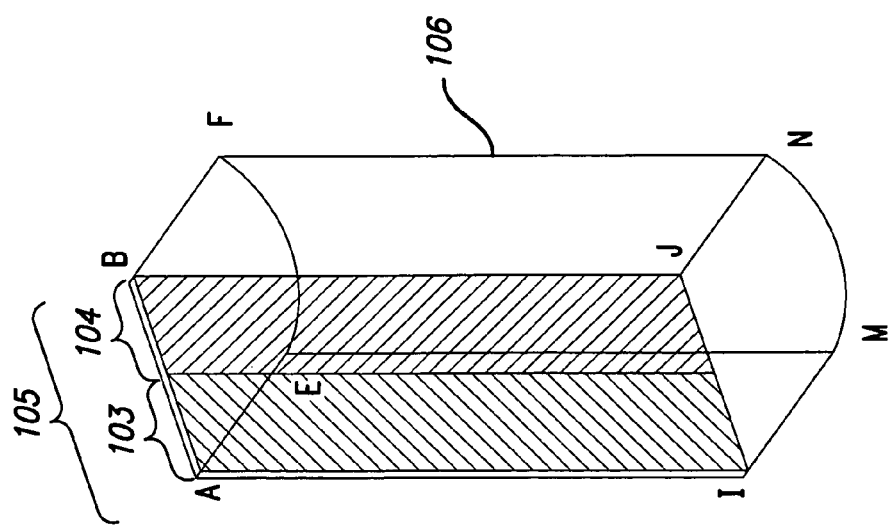
FIG. 1C is a perspective drawing showing the test target for calibrating the pitch of the print with respect to the pitch of the lenticular screen.

The inventive technique for maximizing the viewing zone of a lenticular stereogram uses the lenticular screen as a calibration and measurement tool to determine the optimum print column width for a specific viewing distance. FIG. 1C shows an embodiment of the present invention having a lenticule 106 and a corresponding print area 105 which is made up of two stripes 103 and 104. In the inventive technique, these two stripes are of complementary or contrasting color. For example, stripe 103 and stripe 104 may be black and white, or magenta and cyan, or green and red, respectively, or any other condition of distinguishable colors. Full-sized stereoscopic image prints with contrasting colors having precise column widths may be produced with an interdigitation computer program. Thus, a series of two color test prints can be made having incrementally different image column widths. Image prints can be produced having a column width accuracy of 0.01 inch or better.

The two color test prints may be used with a stereogram image viewing device to determine the optimum image print column width for a specific viewing position. A lenticular stereogram image print produced with an optimum print column width will be fully viewable and have optimal three-dimensional appearance. Because a single image print column width cannot be optimally viewed from all positions, the image print column width is designed for a specific viewing distance. Generally, the lenticular stereogram is designed to be viewed from a central position, however, the distance at which the lenticular stereogram is viewed is variable.

Figure 2:
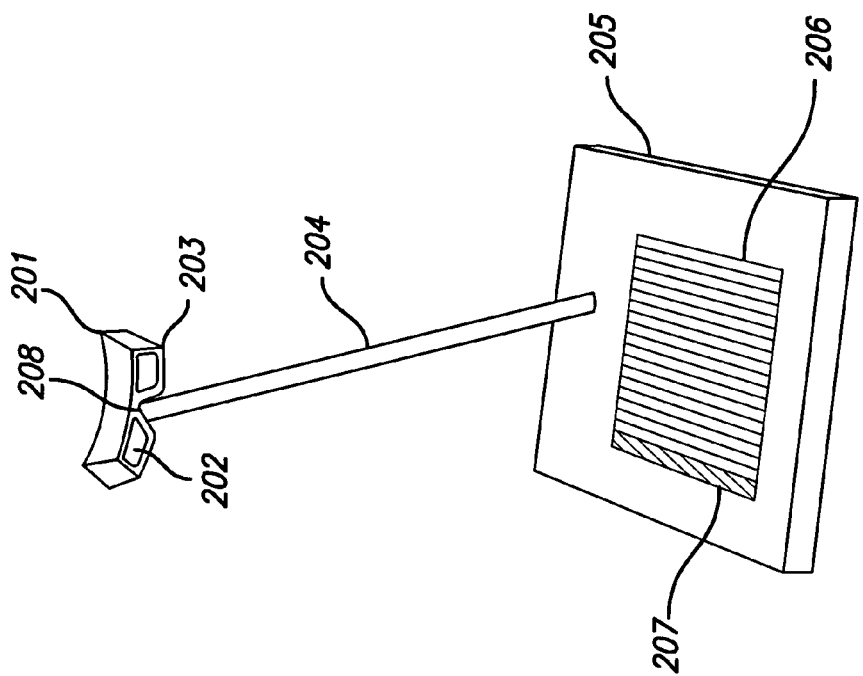
FIG. 2 is a drawing of the apparatus used to locate the observer while adjusting the lenticular screen and test target.

A stereogram image viewing device may be used to view the two color test prints from a specific viewing position. An embodiment of a stereogram image viewing device is illustrated in FIG. 2 and includes: a location device 201 having eyeholes 202 and 203, a post 204 and a baseboard 205. The post 204 rigidly holds the location device 201 over the baseboard 205. The lenticular screen 206 is placed in intimate juxtaposition with the print 207 such that the center lenticule is directly over the center print column. The aligned print 207 and lenticular screen 206 are placed directly under the viewing device 201, such that the lenticules are vertically oriented relative to the viewer and the center of the print 207 is centered below a mid-point 208 between eyeholes 202 and 203. A viewer observes the print 207 through the eyeholes 202 and 203. In an alternative embodiment, digital cameras are positioned to view the print 207 as if from eyeholes 202 and 203.

If the width of the print columns is optimum with the focal points of the lenticules each falling upon proper columns of the print areas (as illustrated in FIG. 3C), the image 207 will appear to be one uniform color from eyehole 202 and the complementary or contrasting uniform color from eyehole 203. Imperfections in the test print or lenticular screen may cause slight imperfections in the viewed images. A test print having an improper print column width will not appear to be uniform in color. By observing a series of test prints with different print image column widths through the stereogram viewing device, the print having the most uniform observed colors from the eyeholes 202 and 203 may be rapidly determined. The best column width dimension for this test print is input into the interdigitation program to produce stereoscopic image prints having the optimum image column width and an optimized viewing zone.

Observation of the print through the stereogram image viewing apparatus and lenticular screen is a highly accurate measurement tool that allows the optimum print image column width to be quickly determined. In the art, the term pitch is often used to describe the print column width or the lenticule width. Pitch is the number of columns, or number of lenticules, per inch. If the print/lenticular screen combination is viewed from some great distance, the pitch of the print columns and lenticules are equal. In another example, at a viewing distance of 3 feet, a lenticular screen having a nominal pitch of 58.23 produces a maximum viewing zone when used with a print having a pitch of 58.35, i.e. 58.35 columns per inch. A stereoscopic print which has been optimized for a viewing distance of three feet also produces good stereoscopic imaging from a viewing distance of approximately two to five feet.

There are also many variations in the basic inventive technique. The inventive technique may be used for rear-projection slides as well as calibration or alignment of motion pictures, electronic images and lenticular screens used with electronic displays and combinations of these known displays. In particular, computers may incorporate a lenticular screen and an interdigitation program that allows the test images to be projected so that the optimum viewing zone may be determined for a particular user. The computer would then display stereoscopic images having the optimum column width magnification in optical alignment with the lenticular screen. Alignment of the projected image with the lenticular screen may be achieved via the display controls or software.

In another embodiment, a series of print patterns having different column widths is provided that may be viewed from a single location by a single eye. An appropriate series of test patterns having different column dimensions may be used to empirically calibrate the optimum width and location of the image print columns with respect to the lenticules and optimize the viewing zone.

Figure 4:
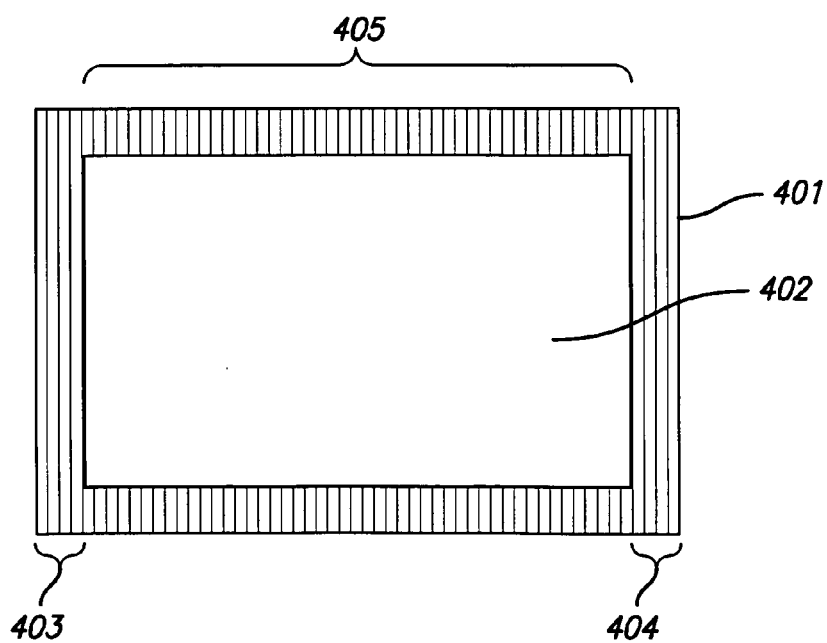
FIG. 4 is a test border and columnar stereogram print or projected display.

In another embodiment, a two-color test print may also be combined with image prints for alignment purposes. Referring to FIG. 4, a print 401 having a two-color border pattern in regions 403, 404 and 405, and a picture area 402, may be aligned using the described alignment method with a lenticular screen such that the viewing zone is located centrally and not skewed to the left or right. A lenticular screen is placed over the print 401 and the print 401 is viewed through the stereogram viewing device. The two-color border pattern is then aligned and centered with the lenticular screen when the border appears to be one color when viewed with the right eye and the contrasting color when viewed with the left eye.

Again referring to FIG. 4, in another embodiment, a first two-color pattern may be used in horizontal border areas 405 and a second two-color pattern of another type may be used for the vertical border areas 403 and 404. For example, alternating black and white stripes may be used within the columns of vertical regions 403 and 404, and alternating red and green stripes may be used for the horizontal regions 405. The black and white stripes in regions 403 and 404 may be used for rotational alignment of the lenticules with respect to the interleaved print columns. Observing the print through the imaging device, the one eye will observe the vertical border areas 403 and 404 as black and the other eye will observe the vertical border areas 403 and 404 as white. The red and green stripes in region 405 may be used for central alignment of the interleaved print with the lenticular screen by aligning the two-color column at the center of the print 401. Again, one eye will see regions 405 as green and the other eye will see regions 405 as red.

Figure 5:
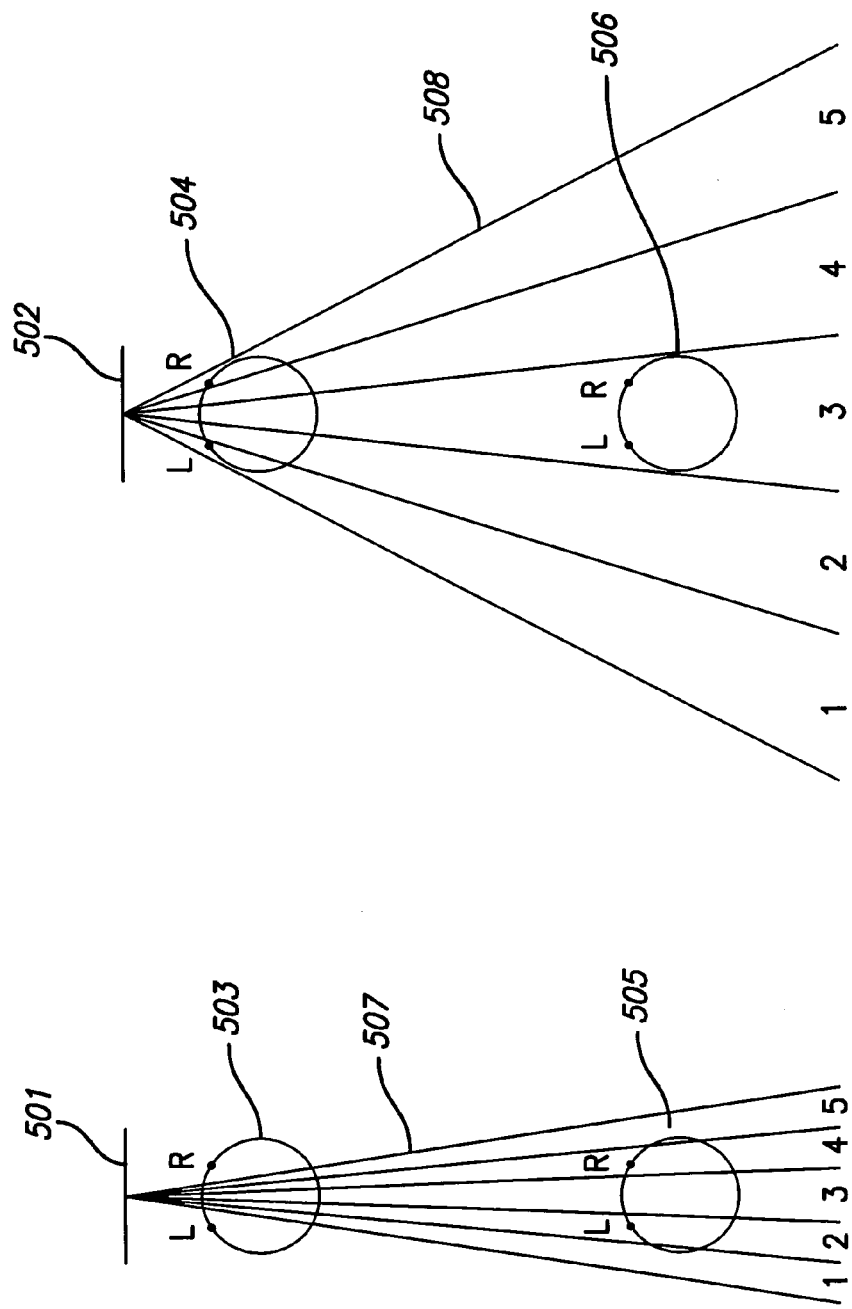
FIG. 5A is a schematic representation of viewing the autostereoscopic image from near and far in a narrow viewing zone.
FIG. 5B is a schematic representation of viewing the autostereoscopic image from near and far in a wide viewing zone.

A further embodiment is illustrated in FIGS. 5A and 5B, which include means to alter the optimum viewing distance of an autostereoscopic display. There is an advantage if the display can be set for a specific distance or a range of distances by the content creator or by the user. In particular, the user may wish to view the display from a desktop viewing distance at one moment, or, for example, may wish to show the display to a group of people from a greater distance.

An arcade game is an example of why one would want to have flexibility in changing the viewing distance. A game has two modes: an attract mode where the viewing distance needs to set to a greater distance and a play mode where the viewing distance needs to set to a closer distance.

It should also be pointed out that the viewing zone angular extent remains constant regardless of how high above or below the screen the user is positioned because the lens screen is refractive in the horizontal dimension and not in the vertical dimension. There is an exception to this if one is using the Winnek formulation disclosed in U.S. Pat. No. 3,409,351, since there is a vertical component to the refraction and there will be movement of the viewing zone as one moves in the vertical direction. We shall now describe how the appearance of the autostereoscopic image may be optimized within a viewing zone for an observer at a given distance.

With respect to FIGS. 5A and 5B, the image areas labeled 1, 2, 3, 4, and 5 correspond to the stripes labeled 1, 2, 3, 4 and 5 in FIG. 1B. Each stripe, which is refracted by the lenticule 101 as one of an aggregate series of lenticules, forms a viewing zone, and each viewing zone is composed of individual perspective views labeled 1, 2, 3, 4 and 5. With respect to FIG. 5A, we see display screen 501, close observer 503, the viewing zone 507, and far observer 505. The observers' eyes are labeled L (left eye) and R (right eye). With respect to FIG. 5B, we see display 502, with near and far observers 504 and 506 respectively, whose left and right eyes are labeled L and R respectively. The viewing zone is labeled 508.

FIGS. 5A and 5B are schematic representations and have been created for didactic purposes. They contain exaggerations and simplifications, but they accurately illustrate the concept. The angle of the viewing zone, which in FIG. 5A is substantially narrower than in FIG. 5B, can be controlled by the geometric relationship of the stripes to the lenticules.

This can be controlled by means that have been described, in terms of alignment of the viewing zone, to produce an optimum effect with respect to what has been termed the parallax condition. This refers to the columnar-structured image elements and the associated columnar lenticules that must be in alignment. The center of the perspective view is typically viewed at a near-perpendicular viewing angle, as described above, in which case the columns at left and right image edges will be viewed at acute angles. The parallax effect occurs at such acute viewing angles and creates a lack of precise juxtaposition between the columnar-structured image elements or stripes and the associated columnar lenticules, as has been stated above.

Means similar to the teachings given above can be used, over a certain range, to optimize the angular extent of a viewing zone and to produce the best possible result for a particular viewing distance.

It should be stated that, although the material in this disclosure is described in terms of a display that has the traditional lenticular disposition with the boundaries of the lenticules (i.e., where the individual lenticules intersect) being disposed in the vertical direction (i.e., parallel to the vertical edge of the lens sheet or display), what we are disclosing here will also work in the context of a diagonally-oriented lenticular sheet as described by Winnek.

We can control the extent of the viewing zone by the means that have been described above, and the motivation for changing the angle of view (although exaggerated, as has been pointed out in FIG. 5A compared with FIG. 5B) is explained best by looking at illustrations 5A and 5B. We can see that for position 503, the left and right eyes fall outside of the viewing zone. In other words, the observer in close proximity will see images with the left and right eyes that are inappropriate because the stripes (1,2,3,4,5) do not fan out to produce optimized viewing with respect to each eye. Indeed, as seen in the illustration, it is entirely possible for the observer to be seeing pseudoscopic rather than stereoscopic zones since the eyes can fall outside of the progression of stripes (perspective views 1-5) within a zone.

In 505, the observer at a greater distance is seeing, as depicted in the illustration, image stripes 2 and 4, which produce a satisfactory stereoscopic effect. What then can be done to accommodate the user who is at close distance 503?

With respect to FIG. 5B, the observer is now labeled 504 at the same distance from display 502 which corresponds to the viewer 503 distance from display 501 in FIG. 5A. We see that the observer's left and right eyes fall comfortably within the viewing zone, and a stereoscopic image will be observed. Let us now pay attention to the observer at greater distance 506 in FIG. 5B, which corresponds to observer 505 in FIG. 5A. The observer's left and right eyes now fall within a single perspective view; therefore, there is no stereoscopic effect because the angle of view of the zone is too great for the observer's distance. Therefore, at a great distance with a wide angle-viewing zone, there is no stereoscopic effect. Similar arguments can be made if the observer's left eye were to, for example, see perspective view 3, and the right eye would see perspective view 4, which would not give an effective interaxial separation as great as, for example, if the observer were seeing with the left eye view 2 and with the right eye view 4.

We can see that by changing the extent of the viewing zone, or the angle of the viewing zone, we can accommodate observers at different distances. In one case, for example in FIG. 5A, when the observer is at position 503, there is no stereoscopic effect, whereas the stereoscopic effect for the distance represented by the observer at 505 would be good. On the other hand, to correct the situation, we then, in effect, create a wider viewing zone by changing the distance between either the columns or the stripes. All of this is accomplished by means of software adjustments through an interpolation process to repeat or subtract pixels either within an image stripe or between stripes, and to either control the distance between columns or the distance between stripes.

Accordingly, we see that by a software manipulation, and by changing the appropriate distance in a manner that is analogous to that which has been described in this disclosure in the context of optimizing the viewing zone for a lens sheet, we can optimize the viewing zone for an observer's distance.

Such a distance could be set in software so that a given lenticular display can be optimized for various viewing distances. It should be understood that optimum distances are in a certain range. For example, setting a display for an optimum distance of three feet will provide good viewing from about two to five feet, and setting the display for an optimum viewing distance of eight feet may well allow an observer to view effectively from about six to fifteen feet. So we are not talking about absolute values in some cases; we are talking about a range of values.

Means can also be provided for automatically altering the optimization by using distance gauging of an observer. An automatic range-finding process can do this so that the display will automatically adjust itself by means of the changes described here, to optimize the stereoscopic effect in accordance with the observer's distance from the display screen.

There are many kinds of range-finding devices which have been described in the literature and which are actually employed in a wide variety of products. The issue is selecting a device technology with the lowest price for the desired performance, but in this case, relatively low accuracy is required to achieve a satisfactory effect so that the manufacture of such a system can be accomplished with a low cost of goods. Sonar, radar, or a wide variety of techniques such as those used for consumer cameras can be employed. The viewing distance can also be optimized for an aggregate of observers using simple logic and an averaging process.

Figure 6:
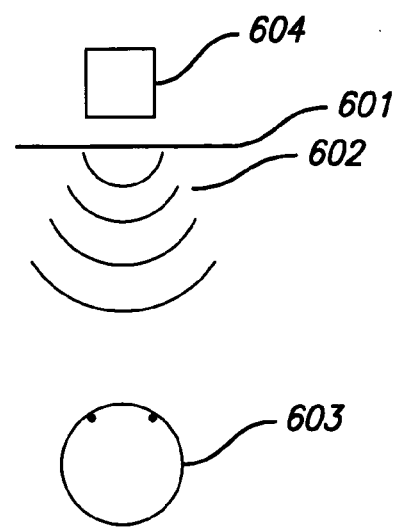
FIG. 6 is a schematic representation of a distance tracking system to be used in conjunction with our teachings with the aid of drawings 5A and 5B.

With respect to FIG. 6, we see the autostereoscopic display 601 in association with a device 604 that is a range-finding device of some type that gauges the distance of observer 603.

We will now describe in some detail the actual software embodiment to be employed in order to carry out the optimization procedure described here.

The software interdigitation calculations for an autostereoscopic display have been previously described in U.S. patent Publication No. 20020011969 entitled, "Autostereoscopic Pixel Arrangement Techniques," which is hereby incorporated by reference.

Figure 7:
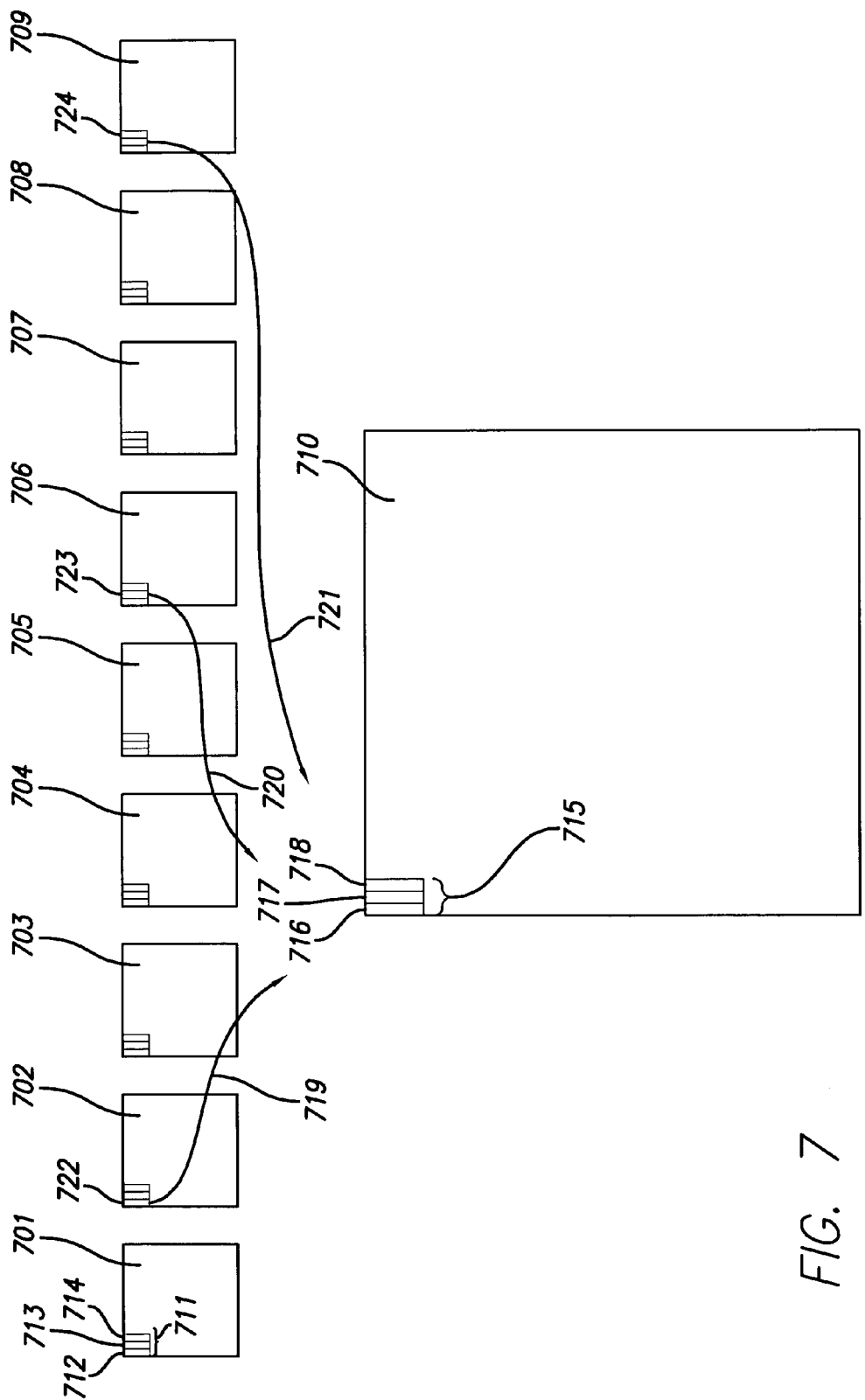
FIG. 7 is a conceptual representation of the software interdigitation process.

As shown in FIG. 7, the logic assumes that a finite number of equally sized stereo views (701-709) need to be interdigitated into a display (710). The process of acquiring these stereo views varies from computer generation to photography acquisition. They may be stored in a computer file or rendered interactively. When they are input into the software interdigitation process, the views are represented in a raster form where each color pixel (711) in the view's raster grid is defined with Red 712 Green 713 and Blue 714 subpixels. Likewise, the display 710 is a physical raster display with color pixels 715, which are actually a set of Red 716 Green 717 and Blue 718 subpixels. Although theses subpixels may have a gap between them and hence not fully fill the pixel area, the calculations below are not affected.

The dimensions of the stereo views 701-709, relative to the dimensions of the screen 710 do not effect the calculations. In the preferred implementation, there are nine equally sized stereo views, and the size of the display is equal to 3× the horizontal size of a stereo view as well as 3× the vertical size of a stereo view. The interdigitation process does not alter the aspect ratio of the stereo views, so it is assumed the aspect ratio of the stereo views matches that of the display.

The software interdigitation process determines the mapping of subpixels from the stereo views into the display surface subpixels. There is a mapping for each Red, Green and Blue subpixel in every display pixel. As an example, for the first display pixel 715, the mappings (719 Red, 720 Green, 721 Blue) of the subpixels (716,717,718) each reference a subpixel (722, 723, 724) in a stereo view (702, 706, 709).

Figure 8:
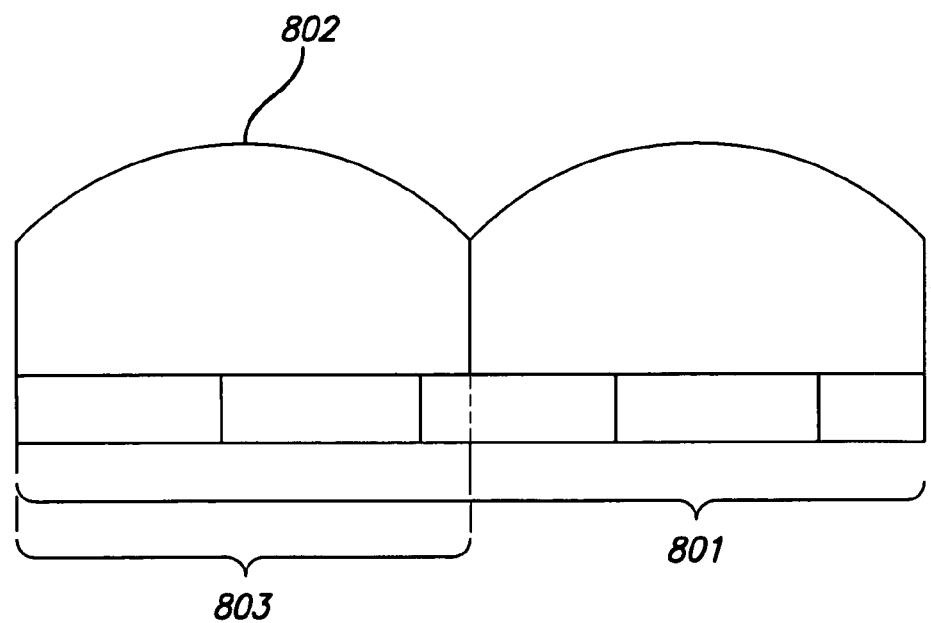
FIG. 8 is a schematic representation showing how the lenticular pitch is determined.

The physical width of the subpixels on the monitor can be measured as can the physical width of the lenticules. A common measure relating them together is to determine the pitch ratio of pixels to lenticules. FIG. 8 shows a series of lenticules 802 lying over a row of pixels 801 in the display. The pitch 803 is the number of pixels that a single lenticule covers. The number need not be a whole number.

Determining this pitch ratio makes it simple to describe the geometric relation between the lenticules and display RGB subpixels that lie underneath the lenticules.

Figure 9:
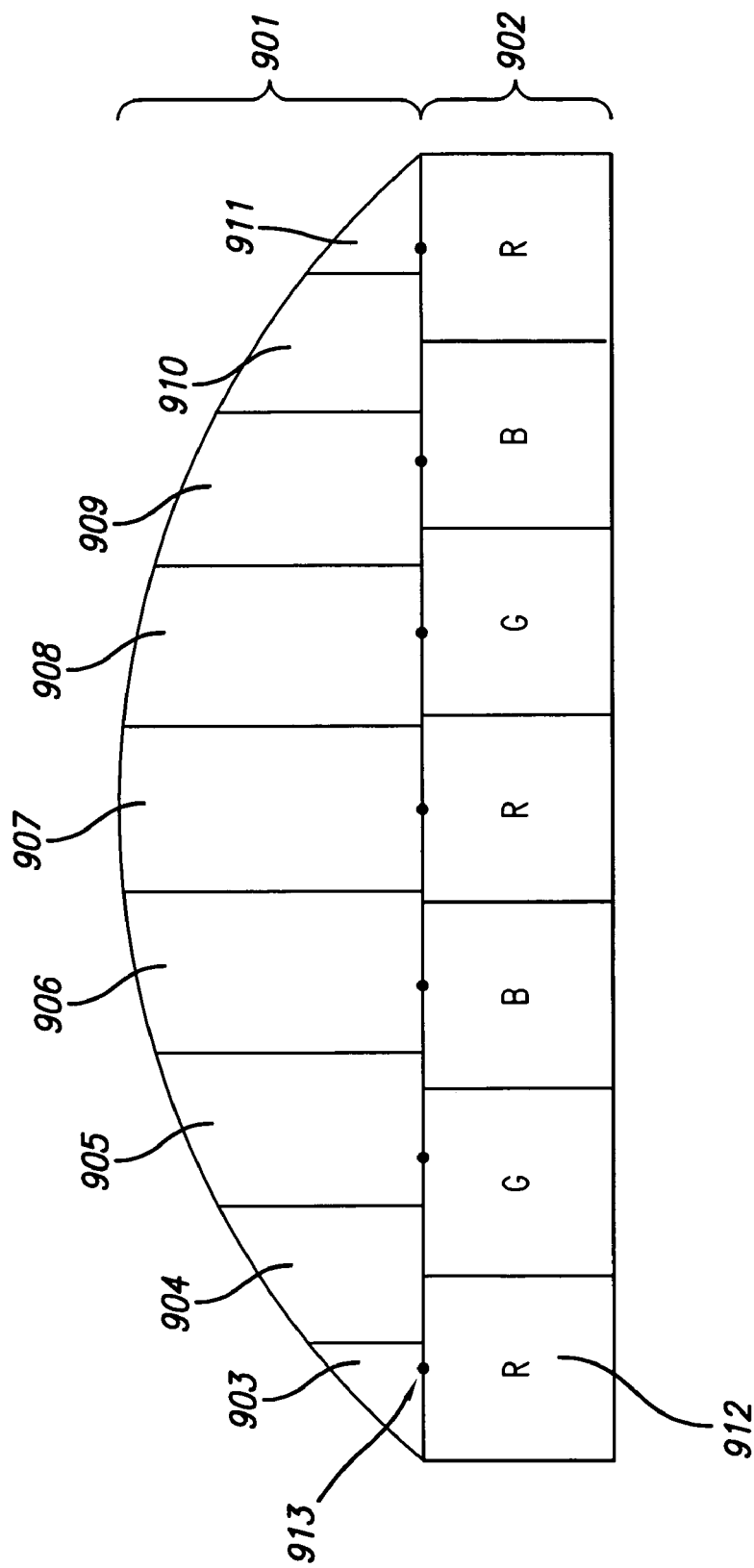
FIG. 9 is a schematic representation showing how sub-pixel mapping is determined.

As shown in FIG. 9, the lenticule 901 that is placed over a row of display pixels 902 is divided into equal sections, one for each stereo view. Each subpixel 912 in the row of display pixels is examined one by one, and the subpixel's center location 913 is calculated. Then, depending on the location of this lenticular section, a particular view is selected for the subpixel. If there are V views, then if the center location falls into the first section, then view V is selected; if the center location falls into the last section, then view 1 is selected, and so forth.

Once the view is determined, the next step is to find a color value to use for the display subpixel. The color value to use is determined by a selecting the same colored (RGB) subpixel in the selected stereo view at the same proportional location (width, height) as the display subpixel.

There are several variations to this logic including doing a weighted approach that accounts for all lenticular sections that a subpixel lies under. Also, the slant of lenticules relative to the raster display needs to be taken into account. However, for our purposes with describing this invention involving viewing distances, neither of these refinements need to be taken into account.

A test program is utilized in creating interdigitated views. A fixed number of views are defined using contrasting colors (Red/Green, Black/White, etc). In one standard implementation, nine views are defined with the first 4 red, the middle one black, and the last 4 green. The operator enters a value for the ratio of the pitch of the lenticules with respect to the pixels and specifies the width and height dimensions of the display. A resulting interdigitated pattern is then calculated and displayed on the display. When properly viewed at a known distance, the operator will see red in the left eye and green in the right eye.

By using such a test program and viewing the resulting pattern at various distances, the operator can empirically determine the optimal pitch value at each desired viewing distance. This process involves iterating over pitch values until the viewed pattern appears solid red in one eye and solid green in the other eye at the desired viewing location. When completed, a pitch table containing viewing distances and lenticule pitches is created. It should not be assumed that the relationship of pitch values to viewing distances is proportional.

The number of entries in the table is flexible. Several strategies can be used when constructing the table. First, predefined distances for all monitors may be desired. For example, two fixed viewing distances (e.g., 3 feet and 15 feet) might be deemed adequate for all viewing situations. Second, a continuum of viewing distances might be desirable. In this case, pitches for as many viewing distances as possible need to be determined. Third, qualitative distances (e.g., close, medium, far) for which physical distances can vary between monitor models may be desired.

With the pitch table defined by using the above-mentioned test program, the next goal is to apply the table information into an interdigitation viewing program. Such a program (as described in the above-mentioned U.S. patent Publication No. 20020011969) uses a mapped approach to perform the interdigitation. The maps relate views to subpixels and were described above. By creating maps with different pitch values, resulting interdigitated views optimized for specific viewing distances can be achieved.

Figure 10:
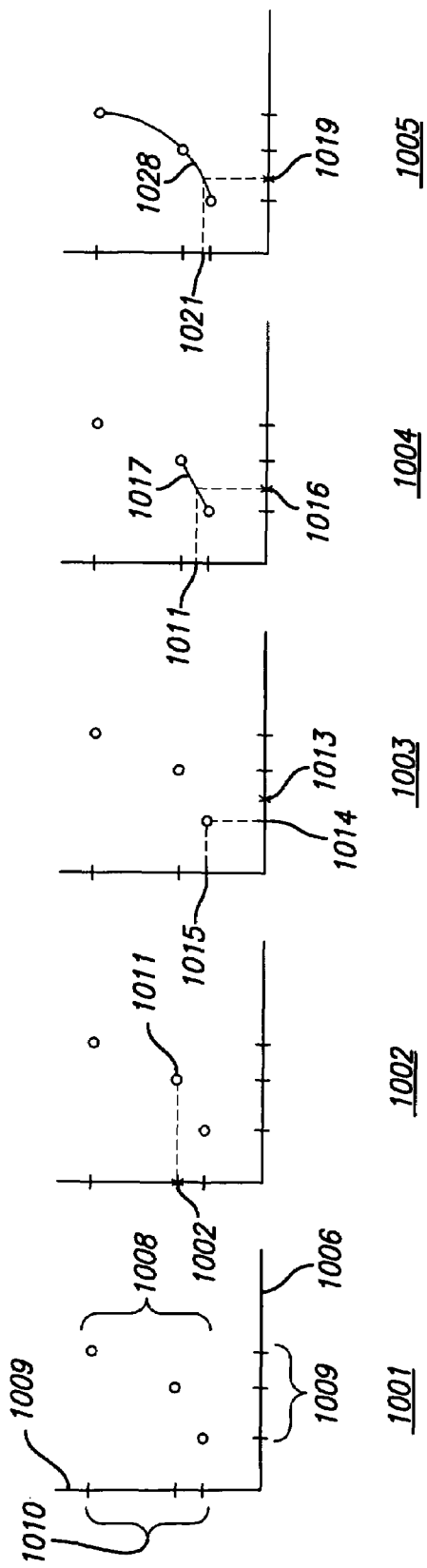
FIG. 10 is a set of graphs showing four viewing distance to pitch implementations.

FIG. 10 shows several implementations using a pitch table. The pitch table can be represented as a graph 1001 with the viewing distance defined on the x-axis 1006 and the pitch defined on the y-axis 1007. Each entry in the pitch table can be represented as a point 1008 in this graph that is the representation of the specific viewing location 1009 and pitch value 1010.

There are four possible implementations (1002, 1003, 1004, 1005) using the pitch table. In the first implementation, 1002, it is assumed the pitch table has a default value, 1011, and corresponding pitch, 1012, which can be used whenever a viewing distance is not defined.

In the second implementation, 1003, the user 1013 specifies a viewing distance. A suitable pitch 1015 can be determined by finding the closest viewing distance 1014 defined in the table. A possible use of this implementation is to allow the user to only select one of the distances, which are available in the pitch table.

In the third implementation, 1004, a linear interpolation process is used to arrive at a suitable pitch. In this case, the user enters a specific viewing distance 1016, and a linear interpolation 1017 is used to arrive at a proportional pitch value 1018.

In the fourth implementation, 1005, a cubic interpolation process is used to arrive at a suitable pitch. A curve 1020 is constructed so that it represents the function defined by the pitch points. When the user enters a specific viewing distance 1019, the value of the curve at that point is used for the pitch value 1021.

Once the pitch is determined, an interdigitation map is calculated, and it can be used to perform the interdigitation resulting in an optimal image for the viewing distance specified.

We have described a means for adjusting the horizontal spacing of the mapped subpixel image elements to optimize the viewing of an autostereoscopic image from certain viewing distances or from within a range of viewing distances. The lens sheet itself remains fixed, and the adjustment is made entirely in the arrangement of subpixels that are translated by various means to the left or right in a horizontal direction. Thus, the relative juxtaposition of the subpixels is shifted left or right with respect to the fixed elements of the lenticular sheet. Allowing the lens sheet elements to remain in place provides a practical system for optimizing the viewing distance so that the viewer may see the clearest and deepest stereoscopic view from wherever he or she may be located with respect to the display screen.

The invention claimed is:

1. A method for improving viewing zones for a lenticular stereogram comprising a lenticular screen, the method comprising:
   viewing a plurality of test images positioned behind the lenticular screen from a plurality of selected distances, each test image comprising a plurality of visually distinct columns having at least one column width;
   identifying a relatively visually distinct test image, wherein column width for the test image identified represents a selected column width;
   compiling a table comprising a plurality of selected viewing distances and associated selected column widths; and
   creating at least one interdigitated image for one selected viewing distance using the table by interdigitating image views such that a display area beneath each lenticule in the lenticular screen is made of a number of discrete stripes corresponding to the selected column width corresponding to the one selected viewing distance.

2. A stereogram system having a lenticular screen, comprising:
   a data store arranged as a table comprising a plurality of specified viewing distances from the stereogram system, each specified viewing distance associated with a column width determined by viewing test images positioned behind the lenticular screen from a plurality of selected viewing distances from the lenticular screen, each test image comprising a plurality of visually distinct columns having at least one column width, the specified viewing distance correlated to a selected column width of a visually acceptable test image; and
   a processor comprising an interdigitation program configured to use the table to create at least one interdigitated image for one selected viewing distance by interdigitating image views such that a display area beneath each lenticule in the lenticular screen is made of a number of discrete stripes corresponding to the selected column width corresponding to the one selected viewing distance.

3. A system as in claim 2, further comprising a selector for choosing a desired viewing distance.

4. A system as in claim 3, whereby for a desired viewing distance having no associated column width, a default column width is provided.

5. A system as in claim 3, whereby for a desired viewing distance having no associated column width, the column width associated with the viewing distance closest to the selected viewing distance is selected.

6. A system as in claim 3, whereby for a selected viewing distance having no associated column width, a linear interpolation process between column widths and viewing distances enumerated in the table is used to determine an associated column width.

7. A system as in claim 3, whereby for a selected viewing distance having no associated column width, a cubic interpolation process between column widths and viewing distances enumerated in the table is used to determine an associated column width.

8. A method as in claim 1, further comprising selectively choosing a desired viewing distance.

9. A method as in claim 8, whereby for a desired viewing distance having no associated column width, a default column width is provided.

10. A method in claim 8, whereby for a desired viewing distance having no associated column width, the column width associated with the viewing distance closest to the desired viewing distance is selected.

11. A method as in claim 8, whereby for a desired viewing distance having no associated column width, a linear interpolation process between column widths and viewing distances enumerated in the table is used to determine an associated column width.

12. A method as in claim 8, whereby for a desired viewing distance having no associated column width, a cubic interpolation process between column widths and viewing distances enumerated in the table is used to determine an associated column width.

13. A method for determining a table of column widths and associated viewing distances used to provide enhanced viewing zones for viewing a stereoscopic image, comprising:
providing a plurality of test images, each test image comprising multiple sets of visually distinct alternating columns and each test image having a column width associated therewith;
viewing at least one test image positioned behind a lenticular screen from a test image viewing distance;
identifying a selected column width associated with one relatively visually distinct test image when the one test image appears as one visually distinct image from a left eye viewing position and a different visually distinct image from a right eye viewing position when viewed at the test image viewing distance; and
repeating said viewing and said identifying for multiple viewing distances and compiling the viewing distances and associated column widths in the table.

14. The method of claim 13, further comprising:
creating at least one interdigitated image for one selected viewing distance using the table by interdigitating image views such that a display area beneath each lenticule in the lenticular screen is made of a number of discrete stripes corresponding to the selected column width corresponding to the one selected viewing distance.

15. A method as in claim 14, further comprising selectively choosing a desired viewing distance.

16. A method as in claim 15, whereby for a desired viewing distance having no associated column width, a default column width is provided.

17. A method as in claim 15, whereby for a desired viewing distance having no associated column width, the column width associated with the viewing distance closest to the desired viewing distance is selected.

18. A method as in claim 15, whereby for a desired viewing distance having no associated column width, a linear interpolation process between column widths and viewing distances enumerated in the table is used to determine an associated column width.

19. A method as in claim 15, whereby for a desired viewing distance having no associated optimum lenticular stereogram pitch value, a cubic interpolation process between column widths and viewing distances enumerated in the table is used to determine an associated column width.

* * * * *